May 30, 1967   H. M. PREUSSER ET AL   3,322,592
METHOD AND APPARATUS FOR COMPLETING STACKS OF LAMINATES
Filed June 10, 1963   2 Sheets-Sheet 1

INVENTORS
ROBERT L. BRIDGES
EARL D. HASENWINKLE
BY HENRY M. PREUSSER

Henry W. Haigh AGENT
Leslie G. Nollen ATTORNEY

May 30, 1967   H. M. PREUSSER ET AL   3,322,592
METHOD AND APPARATUS FOR COMPLETING STACKS OF LAMINATES
Filed June 10, 1963   2 Sheets-Sheet 2

INVENTORS
ROBERT L. BRIDGES
EARL D. HASENWINKLE
BY HENRY M. PREUSSER

Henry W. Haigh AGENT

Leslie G. Noller ATTORNEY

United States Patent Office 3,322,592
Patented May 30, 1967

3,322,592
METHOD AND APPARATUS FOR COMPLETING STACKS OF LAMINATES
Henry M. Preusser and Earl D. Hasenwinkle, Seattle, and Robert L. Bridges, Edmonds, Wash., assignors to Weyerhaeuser Company, Tacoma, Wash., a corporation of Washington
Filed June 10, 1963, Ser. No. 286,556
5 Claims. (Cl. 156—297)

This invention relates to manufacturing laminated materials wherein laminae are held together by adhesives. More particularly the invention relates to starting and completing module stacks during substantially continuous flow manufacturing of such laminated materials.

The purpose of the invention is to provide both a method and apparatus to complete stacks of modules at designated intervals prepared for timely removal from continuously operating laminar material manufacturing apparatus.

This invention is particularly important in conjunction with "Apparatus and Method for Manufacturing Laminar Materials Joined Together With Wet Adhesive Webs" as disclosed in United States patent application, Ser. No. 219,410, filed Aug. 27, 1962, now U.S. Patent No. 3,247,-042 and to the "Stacker" as disclosed in United States patent application, Ser. No. 252,185, filed Jan. 17, 1963, now U.S. Patent No. 3,233,891.

When laminates are manufactured using apparatus which operates essentially continuously practicing a method of uniformly manufacturing modules which are to be combined with other modules and select laminae or combined with just select laminae to form complete end products, there are two distinguishable periodic repeating steps to be made. One step pertains to loading respective laminae to create parting lines between modules, and the other step pertains to both loading and possible interim handling of respective lamina to commence and to terminate module stacks.

With respect to the method step of establishing parting lines between modules, the resutling module size of laminated materials is controlled, beyond the arrangement and utilization of specific apparatus as illustrated in the above-mentioned application, Ser. No. 219,410.

(1) By the insertion of two laminae simultaneously on a particular conveyor, the laminae being held in close contact with one another commencing and remaining free of adhesives thereby forming a parting line or place between modules; and/or (2) By the insertion of an additional single lamina near the exit of the apparatus to cover the applied exposed adhesive of a completed module of laminae before contact is made with a follow-on module. By following such a step, as modules emerged from the production line and more particularly from the stacker as disclosed in the above-mentioned application, Ser. No. 252,185, finished products of selected multiple module units are manufactured and stacked.

However, the problem of how to complete stacks remains, or stated in another way, there is a need for a way of completing the last module on top of each stack which in plywood manufacture generally comprises a heating-curing press load.

This problem is handled by utilizing the other step noted previously, to commence and to terminate module stacks. This invention pertains to the method and apparatus utilized during the overall manufacturing process to perform this additional step. Embodiments of the invention are to be described and one of these embodiments is illustarted in the drawings wherein.

Figure 1:
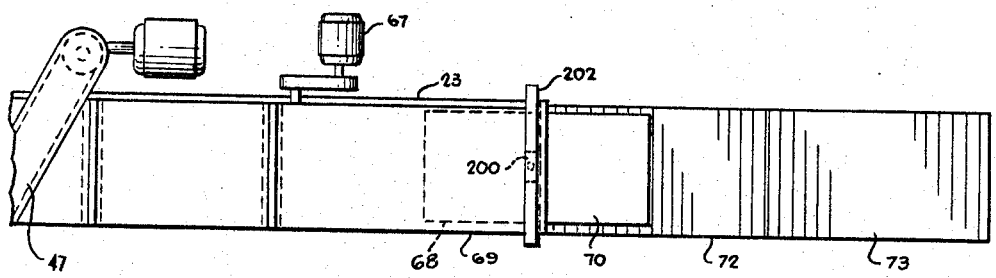
FIGURE 1 is an enlarged fragmentary portion of FIGURE 1 of application, Ser. No. 219,410, showing locations of added apparatus of this invention.
Figure 2:
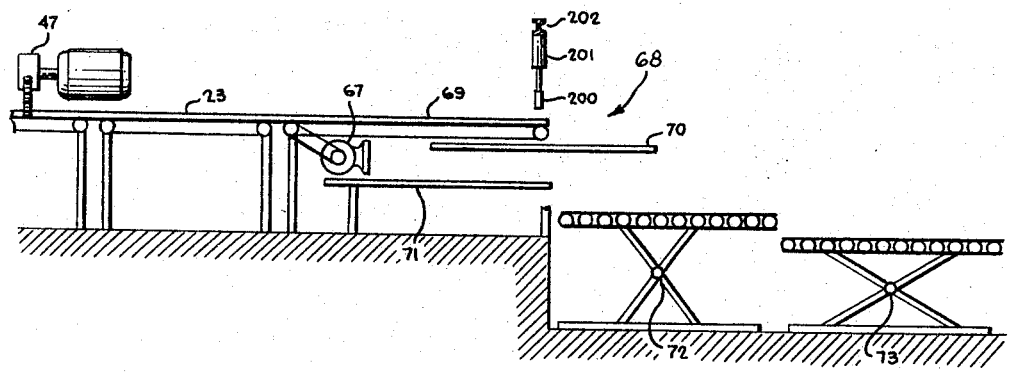
FIGURE 2 is an enlarged fragmentary, portion of FIGURE 2 of application, Ser. No. 219,410, showing locations of added apparatus of this invention.
Figure 3:
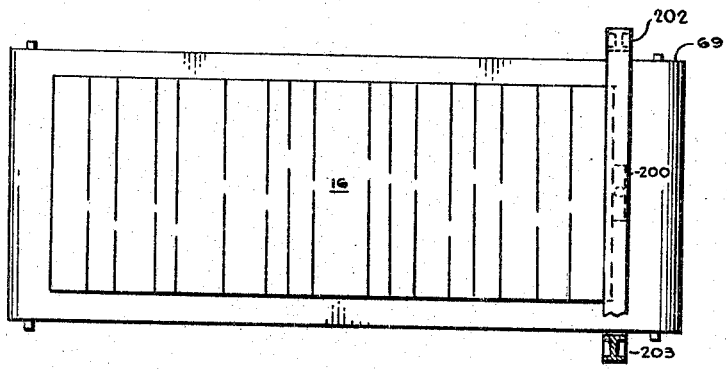
FIGURE 3 is a top view of a traveling module being restrained in part momentarily by the added apparatus.
Figure 4:
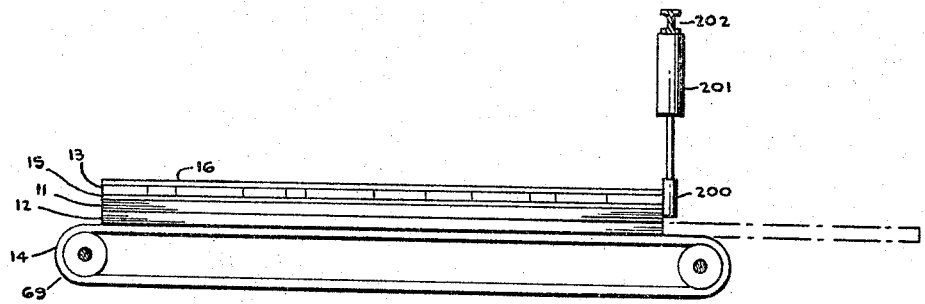
FIGURE 4 is a side view, including some sections, of the module and apparatus of FIGURE 3, dotted lines indicating the advancement of an unrestricted face.
Figure 5:
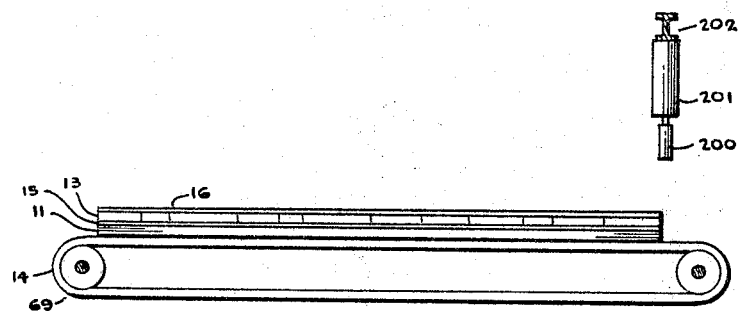
FIGURE 5 is a side view, including some sections, of the added apparatus, retracted in part, to clear the traveling module.

As illustrated in FIGURES 1 and 2, and described in application, Ser. No. 219,410, and further illustrated in FIGURES 1 and 2 of this application, traveling modules are assembled as their individual components are respectively, substantially, and continuously fed to and through the overall apparatus. The apparatus arranged in these figures produces near the production line termination at the stacker, a module which always has an upper surface covered with adhesive and a bottom surface not covered with adhesive. The composition of the follow-on modules will determine whether or not parting lines or surfaces are to be created immediately or subsequently. If a follow-on module has received at least two laminae without adhesives being applied between these co-traveling laminae, a parting line or surface will be established during the concluding accelerating and stacking operation. Therefore, throughout any stack various parting lines or surfaces are determined by providing co-traveling laminae without included adhesives.

When completion of a stack is necessary, the next follow-on module may contain an extra lamina referred to as a face 12 in plywood manufacturing operations as illustrated in FIGURES 1, 2, 3, 4 and 5, or an uncoated lamina may be taken from a nearby source of faces 12 and timely directly dropped unto a stack.

Generally, because of normal and most expeditious ways of transporting lamina, especially faces 12, to a continuous manufacturing apparatus and because of numerous limitations and specifications, stack topping laminae or faces 12, are preferably added to the material flow by initially being combined with a back 11. This procedure centers all controls over laminae arrangements at the commencement of the production apparatus where lamina are piled in readiness before placement on an arranging table prior to feeding unto the conveyor. There is then no need for separate handling equipment and timing-counting accessories necessary to supply stack topping lamina near or after termination of the conveyor system.

If, however, stack topping laminae or faces 12 are to be temporarily co-travelers with modules, separation of stack topping laminae must occur subsequently to complete and to clear a stack before a follow-on module starts a new stack. This separation may be accomplished by having a person (not shown) hold top portions of a traveling module allowing the lower position face 12 to proceed and to clear the retarded back 11 and its adhering laminae, for example, the wet webs 15 and 16 and the cross-band core 13.

Preferably, however, this separation is best accomplished using automatic actuated equipment, such as illustrated in FIGURES 1, 2, 3, 4 and 5. At selected intervals a stopping bar 200 is lowered by an actuator 201 centered over the conveyor run 14 on a cross beam 202 supported at one side on a stanchion 203. The stopping bar actuator 201 completes its downward positioning stroke placing the stopping bar 200 at an elevation to stop all laminae of a module except the bottom face 12 which continues to move ahead on the conveyor 14.

A calibration means (not shown) is provided to preset the downward position of the stopping bar at various clearances above the conveyor depending on the thickness of the face. When smaller thickness faces are being conveyed the clearance of the stopping bar above the conveyor is necessarily minimized and vice versa.

Another approach (not illustrated) to accomplishing this step of separating and sending on a face 12 for completion of a stack by topping it with an uncoated face comprises accelerating a face at an earlier time during continuous manufacturing runs when wet webs and cross-band core materials are not cut or otherwise separated and therefore tend to travel at the predetermined slower overall conveyor speed. A separate in line accelerator section of the overall conveyor assembly is provided and operated at the higher speed only when an uncoated face is to be sent on ahead as a stack topping lamina. This section is described in the previously referred to application, Ser. No. 219,410 as "the module is conveyed to special handling means such as a motor 67 powered stacking means 68, comprising an accelerating means 69, movable receiving trays or stacking plates 70, 71, and powered adjustable lift tables 72, 73."

When, however, the face is to be singled out and sent ahead before the wet webs and cross-band cores are separated between modules, care must be taken not to signal the separating means, such as a flying cut off saw, by passage of the accelerated face which could untimely operate the cut off saw cutting through modules rather than cutting between modules traveling along the conveyor.

In any embodiment, the objective is to present a non-coated face during one spacing among several reoccurring like spaces between modules traveling on a continuous conveyor, so the selected face is readily topped on the stack to be removed. Thereafter, the module which co-traveled along the conveyor with the subsequently accelerated and separated face arrives at a stacker independently to start the new stack on the interim receiving tray of the stacker shown in the above-mentioned application, Ser. No. 252,185, now U.S. Patent No. 3,233,891.

Although the illustrated embodiment employs a positive blocking bar, other retarding means such as spike-like drags or pressure rollers are useable. The objective is the same, however, to provide a means for initiating sufficient relative motion between the module and its co-traveling lamina, noted as the face, thereby separating the face for its independent topping on the then completed stack of modules comprising pre-selected products of various plys.

We claim:
1. In a method of manufacturing laminated products wherein the products are formed by stacking modules of one lamina having at least one surface coated with an adhesive film with other uncoated lamina, the process of placing the topping uncoated lamina on such a stack comprising:
   conveying the last module to one stack with the adhesive film exposed,
   conveying adjacent to said stack an assembly having as its lowest member the topping lamina for said one stack with the first module of the next stack superimposed above it,
   separating said topping lamina from said first module by causing relative motion between said topping lamina and the co-traveling lamina of said first module by said first step of lowering a contacting member into an interference position with respect to the module above said topping lamina, thereby allowing the unrestricted topping lamina to proceed at substantially the conveyor speed while the above module is held back, and
   placing said separated topping lamina on said one stack in contact with said exposed adhesive film.

2. In the method defined in claim 1, after lowering said contacting member into an interference position with respect to said module above said topping lamina, accelerating said unrestricted topping lamina both to clear said topping lamina from beneath said above module and to overtake said preceding last module undergoing stacking thereby becoming the top lamina of both a module and a stack.

3. In a method of manufacturing laminated products wherein the products are formed by stacking modules of one lamina having at least one surface coated with an adhesive film in the form of a wet adhesive web with other uncoated lamina, wherein one lamina is formed of cross-band materials, the process of placing the topping uncoated lamina on such a stack comprising:
   conveying the last module to one stack with the adhesive film exposed,
   conveying adjacent to said stack an assembly having as its lowest member the topping lamina for said one stack with the first module of the next stack superimposed above it,
   separating said topping lamina from said first module by causing relative motion between said topping lamina and the co-traveling lamina of said first module by the step of increasing the speed of a conveyor section in contact with said topping lamina when said above module is restrained by said wet web and cross-band materials, thereby allowing the unrestricted topping lamina to proceed at substantially said conveyor speed while said above module is held back, and
   placing said separated topping lamina on said one stack in contact with said exposed adhesive film.

4. In a machine for continuous flow manufacturing of laminated products commencing with coveying single spaced lamina and periodically co-traveling above and below laminae wherein the single lamina and the above lamina are subsequently attached to additional materials fed to the conveyor means, apparatus for completing the manufacture of selected stacks of panel-like units composed of such laminae and joining materials, comprising: a relative motion creating means including an overhead positioned lamina contacting member and a means to retractably lower the lamina contacting member from a complete clearance position into a position of both interference with the oncoming above co-traveling lamina and non-interference with the oncoming below co-traveling lamina, selectively operated to separate a below co-traveling lamina from beneath the above co-traveling lamina during the continuing operation of the machine whereby the below lamina is subsequently conveyed to the top of a stack of laminated products completing the top product and consequently a stack of products.

5. The relative motion creating means as defined in claim 4, comprising an adjustable speed section of the overall conveyor of the continuous flow manufacturing apparatus selectively operated to accelerate the below lamina from beneath the above lamina for independent handling of the below lamina in completing a top product and consequently a stack of products.

References Cited
UNITED STATES PATENTS

| | | | |
|---|---|---|---|
| 2,323,105 | 6/1943 | Welch | 156—264 |
| 2,703,660 | 3/1955 | Von Hofe et al. | 156—566 X |
| 2,803,459 | 8/1957 | Heimlicher | 271—46 |
| 3,166,312 | 1/1965 | Rehm | 271—32 |
| 3,247,042 | 4/1966 | Denton et al. | 156—288 |

EARL M. BERGERT, *Primary Examiner.*

H. ANSHER, *Assistant Examiner.*